(12) United States Patent
Lumsden

(10) Patent No.: US 6,678,176 B2
(45) Date of Patent: *Jan. 13, 2004

(54) METHOD AND APPARATUS FOR A SOLAR POWER CONDITIONER

(75) Inventor: John L. Lumsden, Boca Raton, FL (US)

(73) Assignee: Enviropower Corporation, Jenson Beach, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/020,060

(22) Filed: Oct. 29, 2001

(65) Prior Publication Data

US 2002/0149955 A1 Oct. 17, 2002

Related U.S. Application Data

(63) Continuation of application No. 09/484,747, filed on Jan. 18, 2000, now Pat. No. 6,351,400.

(51) Int. Cl.[7] ............................................... H02M 3/24
(52) U.S. Cl. ........................................ 363/95; 323/906
(58) Field of Search ............................. 363/95, 132, 97, 363/46, 17, 34, 32; 323/222, 299, 906; 307/73, 66, 67

(56) References Cited

U.S. PATENT DOCUMENTS

| | | |
|---|---|---|
| 4,251,735 A | 2/1981 | Coleman |
| 4,337,429 A | 6/1982 | Stuart |
| 4,390,940 A | 6/1983 | Corbefin et al. |
| 4,445,049 A | 4/1984 | Steigerwald |
| 4,591,965 A | 5/1986 | Dickerson |
| 4,916,382 A | 4/1990 | Kent |
| 5,109,185 A | 4/1992 | Ball |
| 5,668,713 A | 9/1997 | Eguchi et al. |
| 5,677,833 A | 10/1997 | Bingley |
| 5,726,504 A | 3/1998 | Pecukonis et al. |
| 5,734,255 A | 3/1998 | Thompson et al. |
| 5,811,960 A | 9/1998 | Van Sickle et al. |
| 5,892,354 A | 4/1999 | Nagao et al. |
| 5,892,664 A | 4/1999 | Vedder |
| 6,031,749 A | 2/2000 | Covington et al. |
| 6,037,758 A | 3/2000 | Perez |

Primary Examiner—Rajnikant B. Patel
(74) Attorney, Agent, or Firm—Kenyon & Kenyon

(57) ABSTRACT

A method and apparatus for supplementing electrical power production during peak demand power consumption is presented. A solar power conditioner converts DC electrical power provided by solar panels (or otherwise) to AC power and uses this to supplement main AC electrical power generated by a power utility (or otherwise) when needed. Both the DC power and the main AC power are digitalized by analog to digital (A/D) converters and continuously monitored by a central processor (CPU). The CPU aims to match the generated AC power of the inverter to that of the main AC power and, after tripping a breaker, supplements the main AC power with that of the converted power provided by the solar panels. In such a supplementary role, the solar power conditioner can be inserted into a utility's distributed power grid.

36 Claims, 15 Drawing Sheets

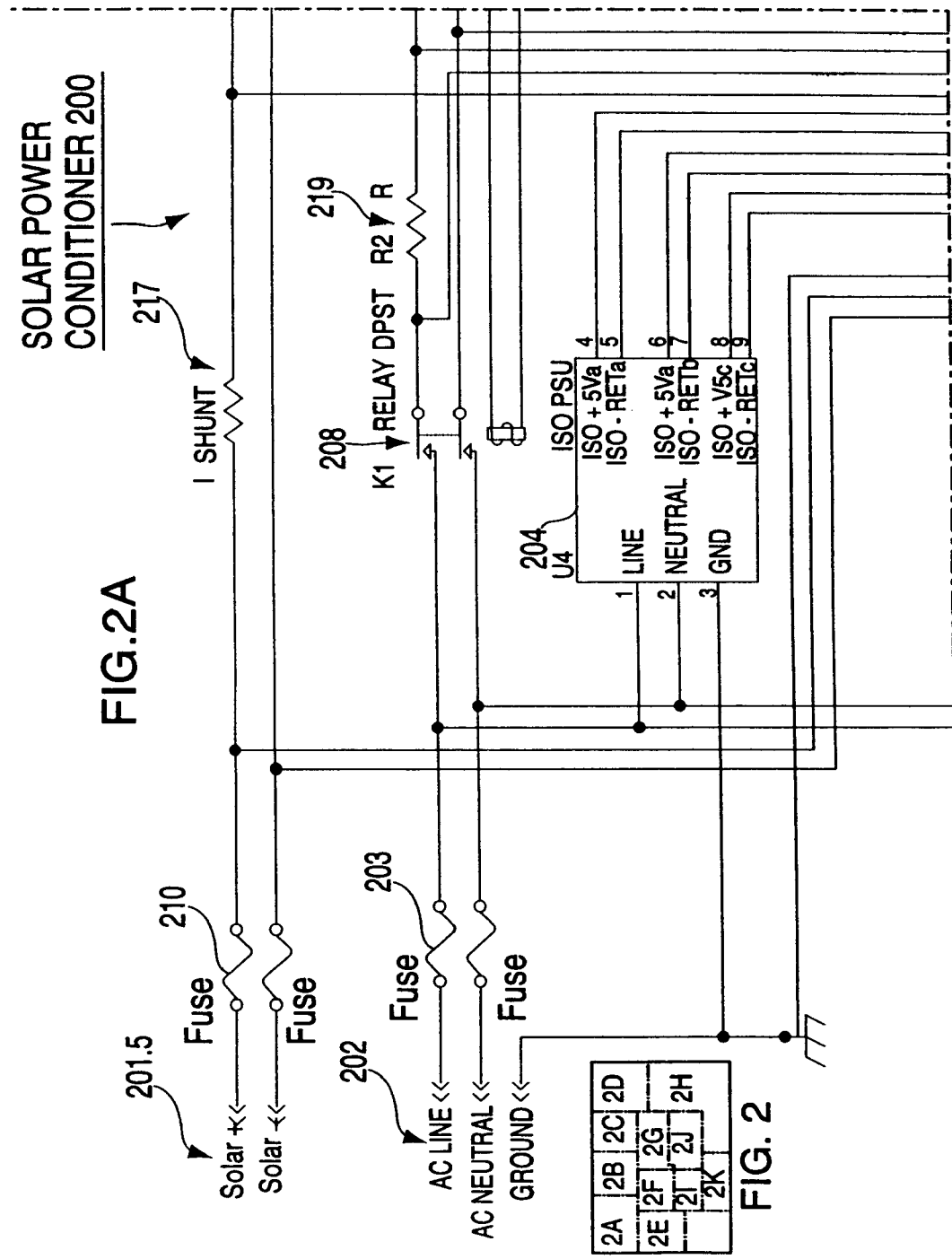

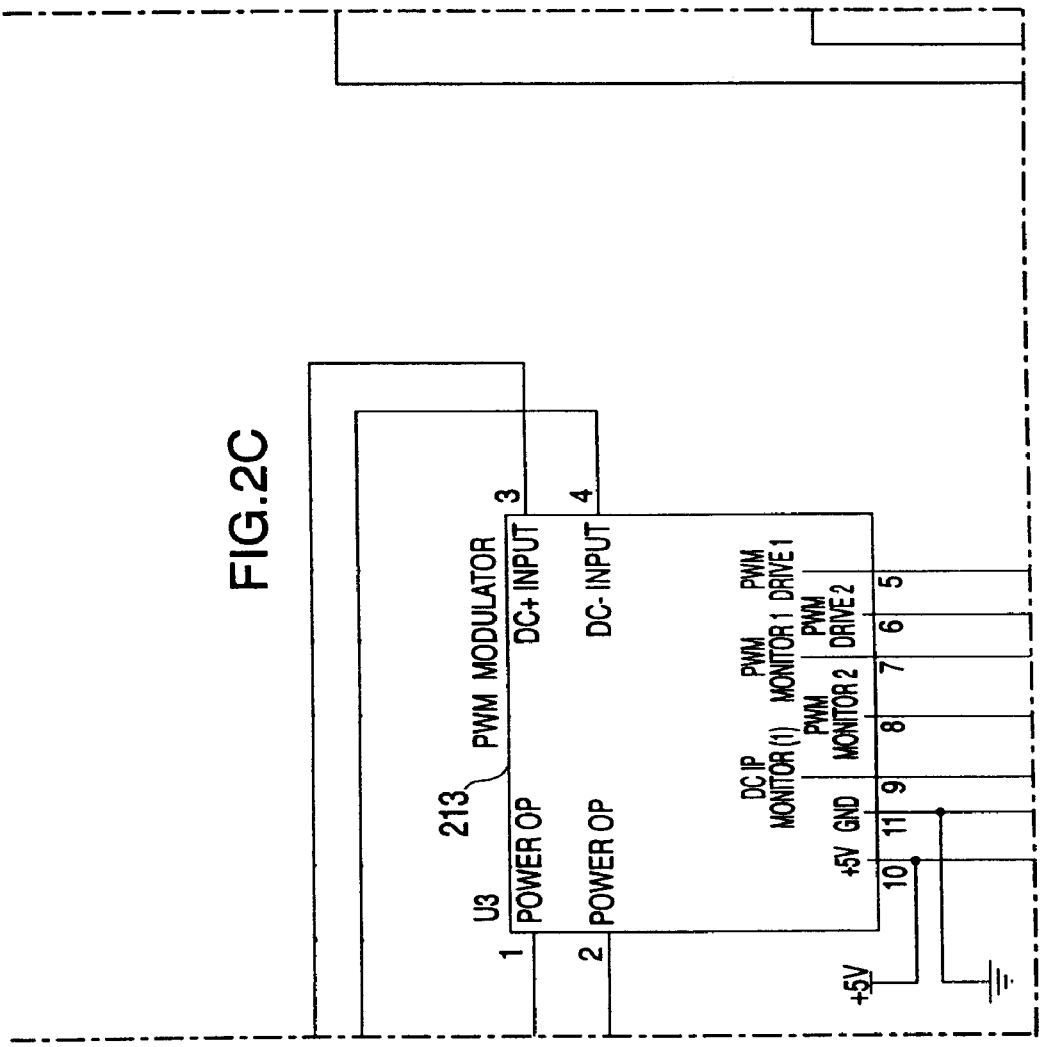

METHOD AND APPARATUS FOR A SOLAR POWER CONDITIONER

RELATED APPLICATION INFORMATION

This application is a continuation application of U.S. patent application Ser. No. 09/484,747, filed on Jan. 18, 2000, which issued as U.S. Pat. No. 6,351,400 on Feb. 26, 2002.

FIELD OF THE INVENTION

The present invention relates to a method and apparatus for a solar power conditioner, and more particularly, to a method and apparatus for enhancing DC to AC power conversion in synchronized power utility distribution grid conditions.

BACKGROUND OF THE INVENTION

The electrical utility industry is presently, and has for some time, labored under the problem of supplying cost-effective power to comply with system peak-demand period requirements. Moreover, our nation's energy demand requirements, especially at peak-demand periods, continue to grow each year. The world at large has an even larger problem since emerging industrial nations require energy to fuel their economic development. This has presented a problem since it is neither financially nor environmentally practical to construct the necessary nuclear or fossil fuel generating plants that would operate at 20% capacity, or less, during less than peak-demand periods. Thus, a means by which electricity can be economically generated is an immediate requirement, especially one that can lend itself to supplementing peak load requirements by an environmentally clean means.

The concept of peak-demand power supplementation is not new. Indeed a number of systems have been tried and implemented over the years, based mainly on batteries, hydroelectric, and combustion turbine or engine schemes. For example, installations using the following have been tried:

1) Storage batteries which store rectified AC power during periods of low demand;
2) Auxiliary oil-fired plants;
3) Wind generation;
4) Hydro-electric;
5) Small, medium and large capacity kerosene/natural gas turbines; and
6) Solar energy.

Each of the above, either by nature or by implementation, has had problems to date. Some are expensive, others are not acceptable environmentally, some pollute, some are ugly and require lots of space, and some require extensive human attention. Solar systems which have attempted to capitalize on solar energy have been, to date, either too expensive, occupied too much space, have not been aesthetically acceptable, are too inefficient, and/or have deviated too much from the electrical utility secondary distribution standards.

Furthermore, many of the above power systems require the use of an inverter in order to convert direct current (DC) to alternating current (AC). Over the years inverters have progressed from electromechanical to thermionic and on to state of the art semiconductor devices. At all stages the aim has been to translate 100% of the DC current into AC current. Earlier inverters used various electrical or electronic means to attempt this. These means can be summarized, for example, as follows:

1) Motor generator sets;
2) Electro-magnetic synchronous mechanical switches;
3) Thermionic tubes (Triode);
4) Thyratrons;
5) Transistors;
6) Silicon controlled rectifiers (SCR);
7) Triacs;
8) Field effect transistors; and
9) IGBT (insulated gate bipolar transistors).

Implementation of the various technologies remained fairly simple in concept and few had the inherent ability to accurately phase synchronize to a reference AC supply.

To date, grid connected, alternate electrical energy generators involving DC to AC production were normally confined to "fields" of photovoltaic arrays (solar farms) or wind farms. The size of such installations was normally greater than 5 kilowatts, with 50 to 100 kilowatt and higher installations commonplace. Converting DC energy into utility grade power required large, bulky and expensive equipment and components, which required close monitoring. Such systems were relatively inefficient with best peak efficiencies only in the 80% range.

Today, because of de-regulation of the electrical generation and distribution industry, and with the nations utilities seeking to implement distributive and/or end-of-line generation, as well as the administration's "Million Solar Roofs" initiative, there is a need for a small, efficient, low cost power conditioner inverter. Such a conditioner would be less than 5 kilowatts in size, with designs that are supportive of cost-effective mass production to achieve enhanced power economics. An inverter as such, presently used in large installations, just inverts, or changes DC power into AC power for isolated electrical loads. Such power has to be further conditioned before it can be interconnected with the utility secondary distribution grid. Employing such means further reduces the overall efficiency of the conversion system. Additionally, such systems utilize analog circuitry, which suffers from performance repeatability problems, thermal stability difficulties, reliability, and poor control of main parameters.

SUMMARY OF THE INVENTION

Accordingly, the present invention provides a method and apparatus for a solar power conditioner capable of supplying electrical power to supplement power, especially during peak-demand periods, generated by an electrical utility. The power supply generated by the electrical utility is monitored through the use of digital signal processing methods, and when needed, supplemented by power generated by solar panels.

Monitoring of the AC power from the electrical utility is accomplished by a central processor (CPU) of the solar power conditioner. The AC power is first digitized by analog-to-digital converters, which digital signal is then used by the CPU to monitor the AC current, voltage, power and phase. Simultaneously, DC power supplied by the solar panels is converted to AC by a pulse width modulator, digitized by analog-to-digital converters and also monitored by the CPU of the solar power conditioner. The CPU matches the generated power of the solar panels to that of the main supplied power by determination of each powers' characteristics and through control of an active filter which reconstitutes the pulse width modulated signal. The CPU further controls a circuit breaker to determine when the power supplied by the solar panels will be used to supplement the AC power generated by the electrical utility.

The present invention, including its features and advantages, will become more apparent from the following detailed description with reference to the accompanying drawings.

DETAILED DESCRIPTION

FIGS. 1 to 4 illustrate a solar power conditioner which converts DC power generated by a solar panel to AC power for supplementing electrical power generated by a power utility. Power is monitored through digitization (i.e., processing of all AC/DC power data is in the digital domain).

Figure 1:
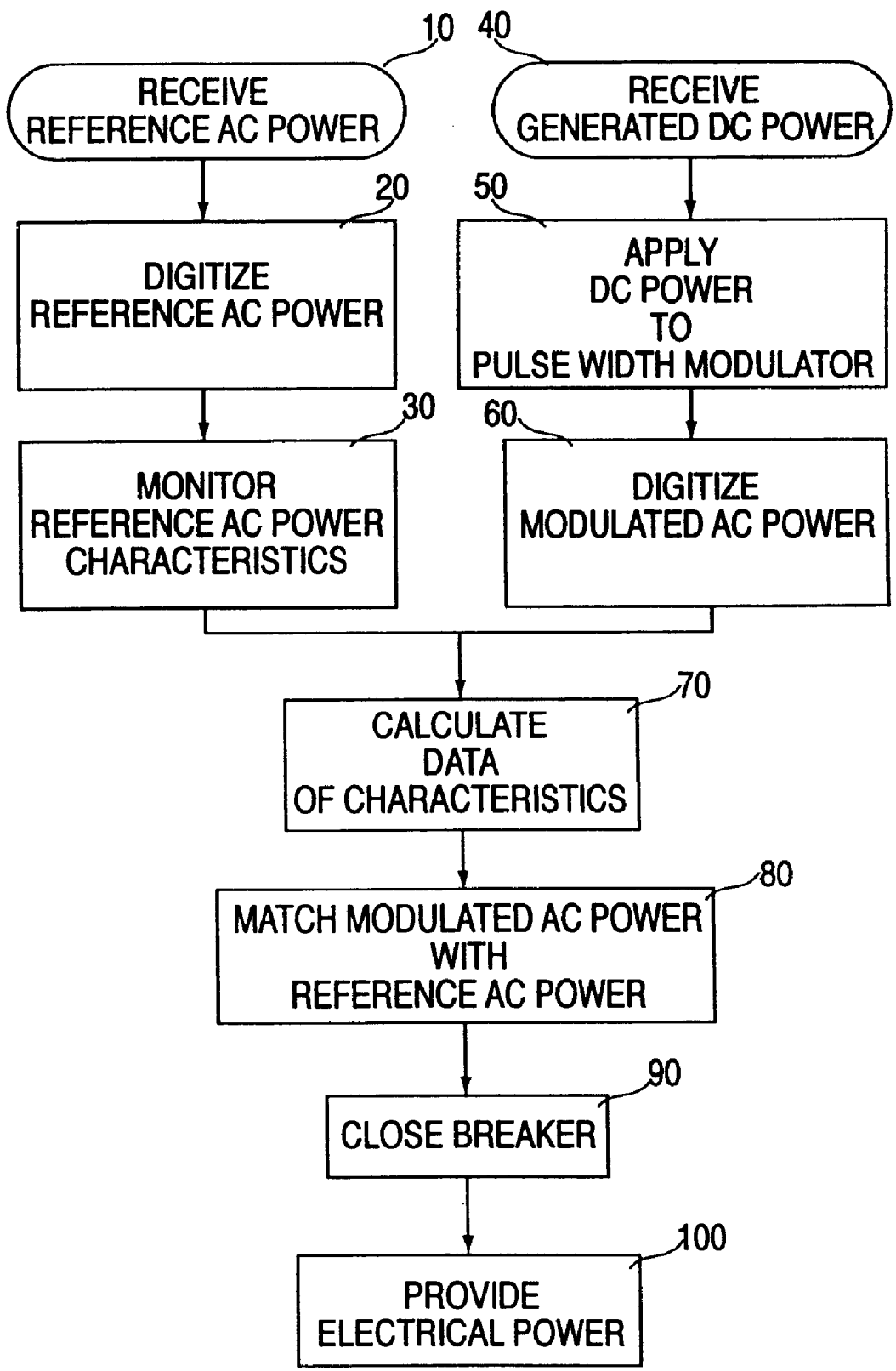
FIG. 1 illustrates a flow chart for a method by which a solar power conditioner converts DC power to AC power for supplementing electrical power generated by a power utility, according to an embodiment of the present invention.
Figure 2B:
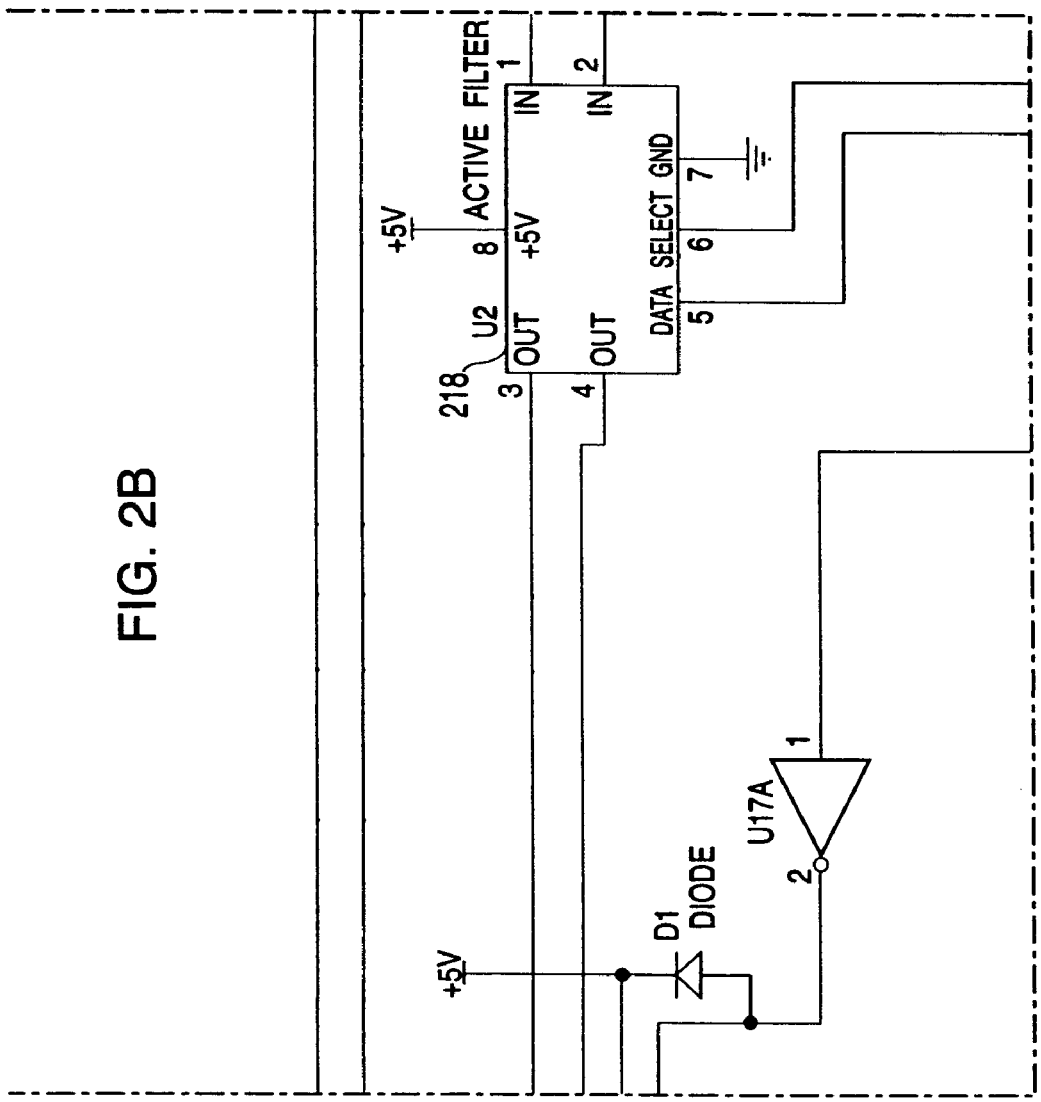
FIG. 2 illustrates a block circuit diagram for the solar power conditioner, according to an embodiment of the present invention.
Figure 2D:
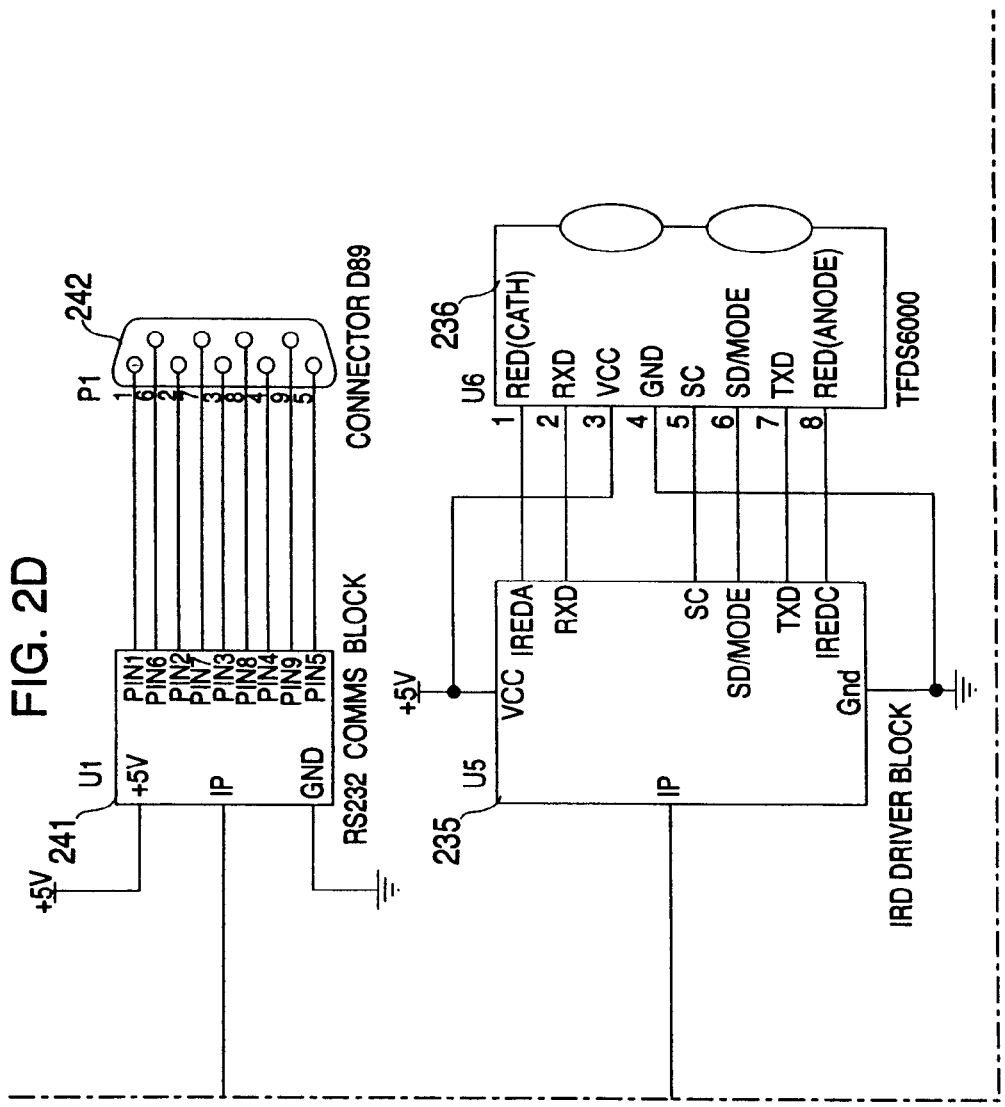
Figure 2E:
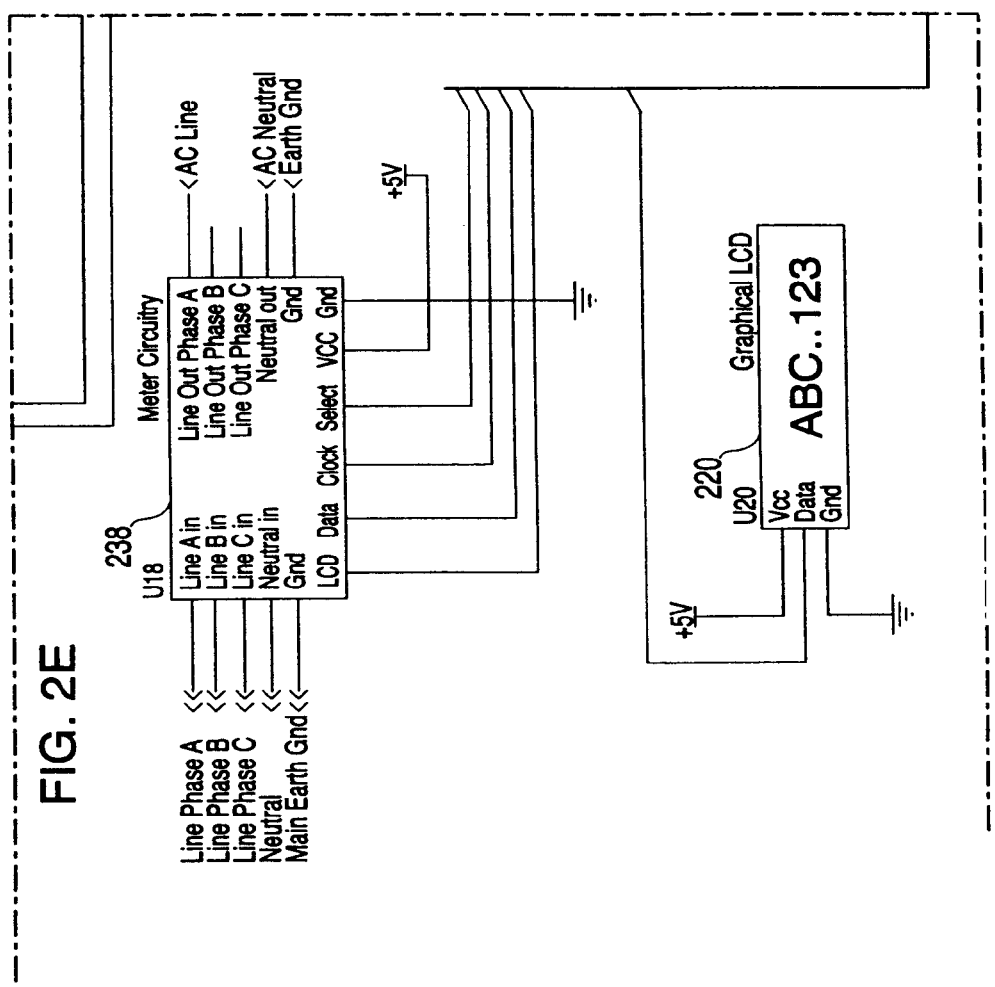
Figure 2F:
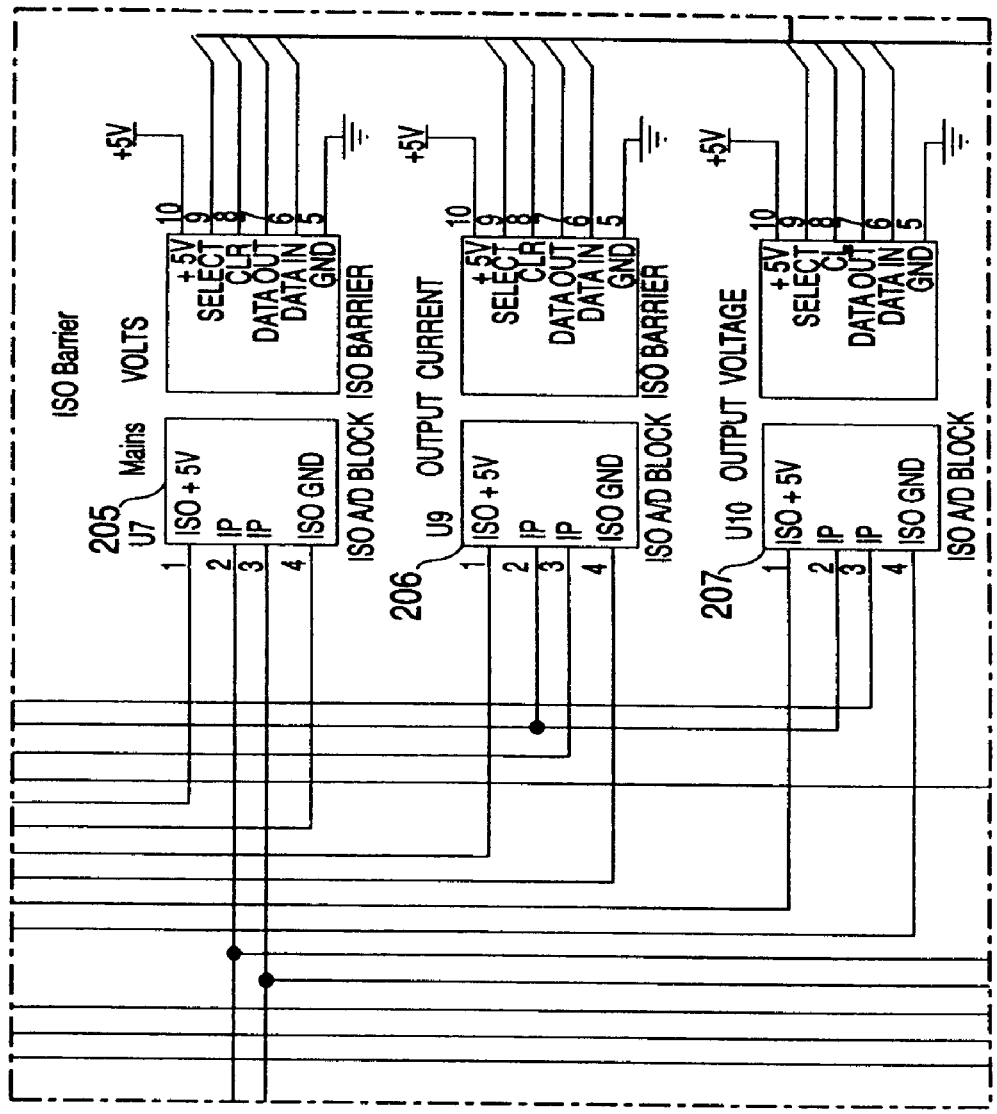
Figure 2G:
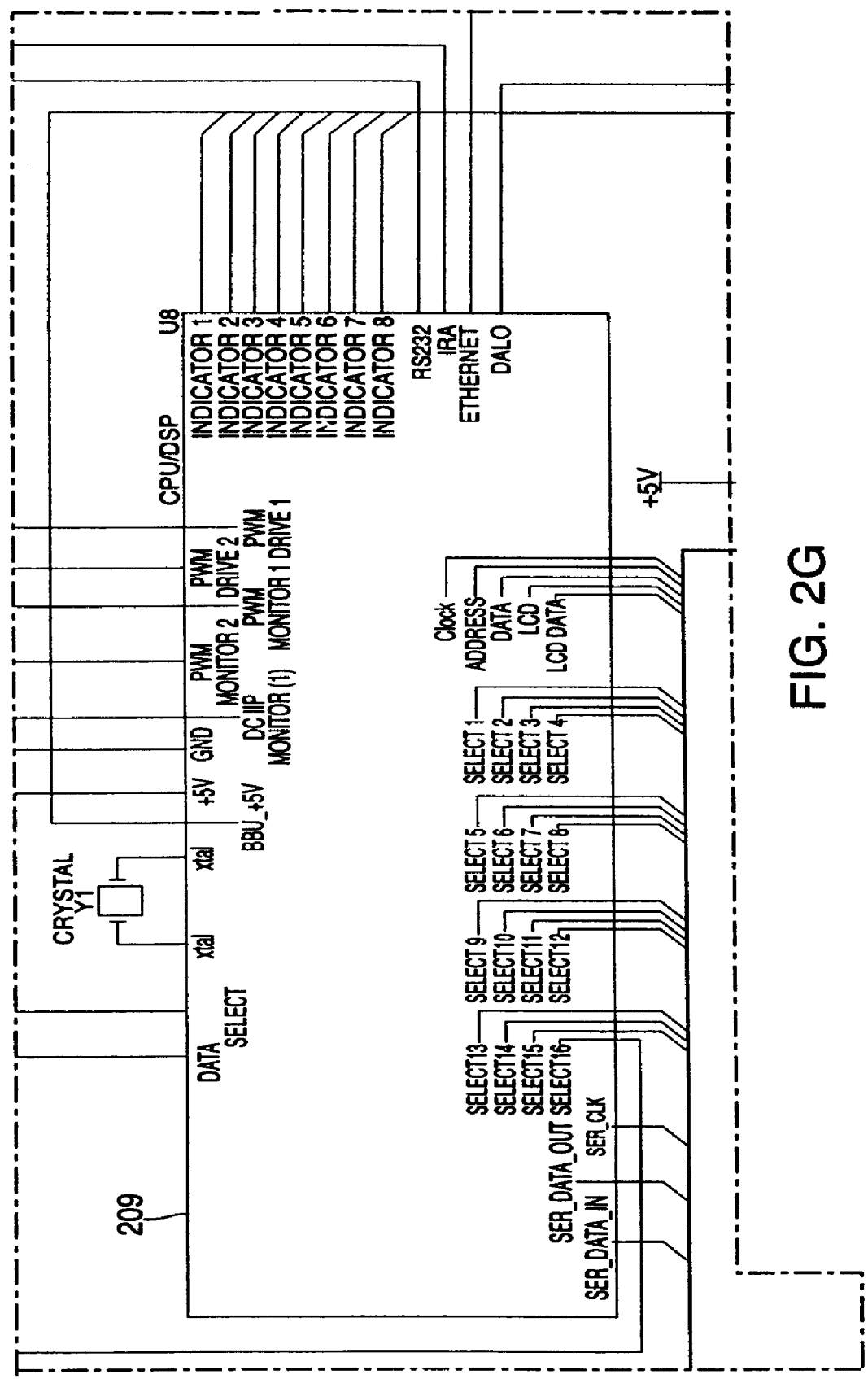
Figure 2H:
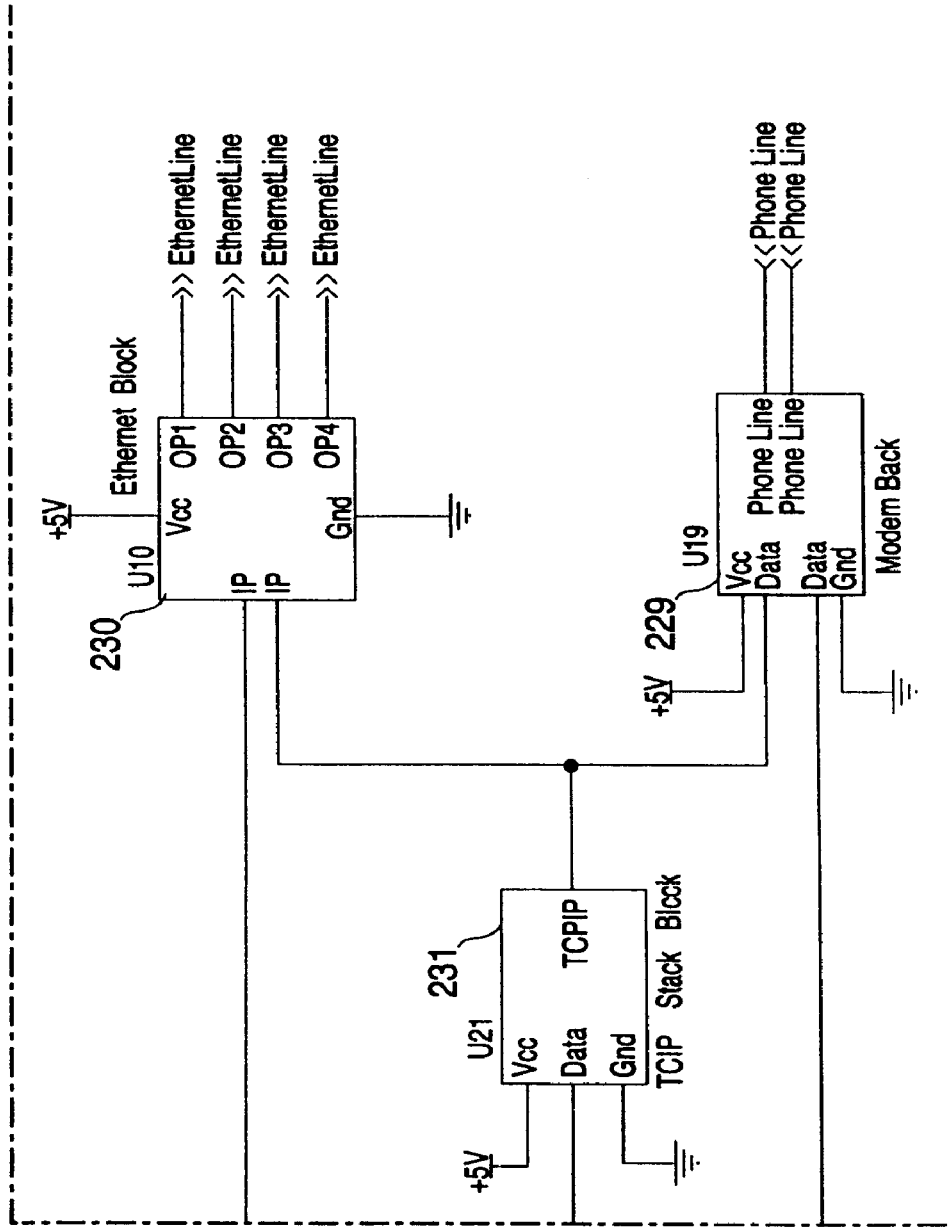
Figure 21:
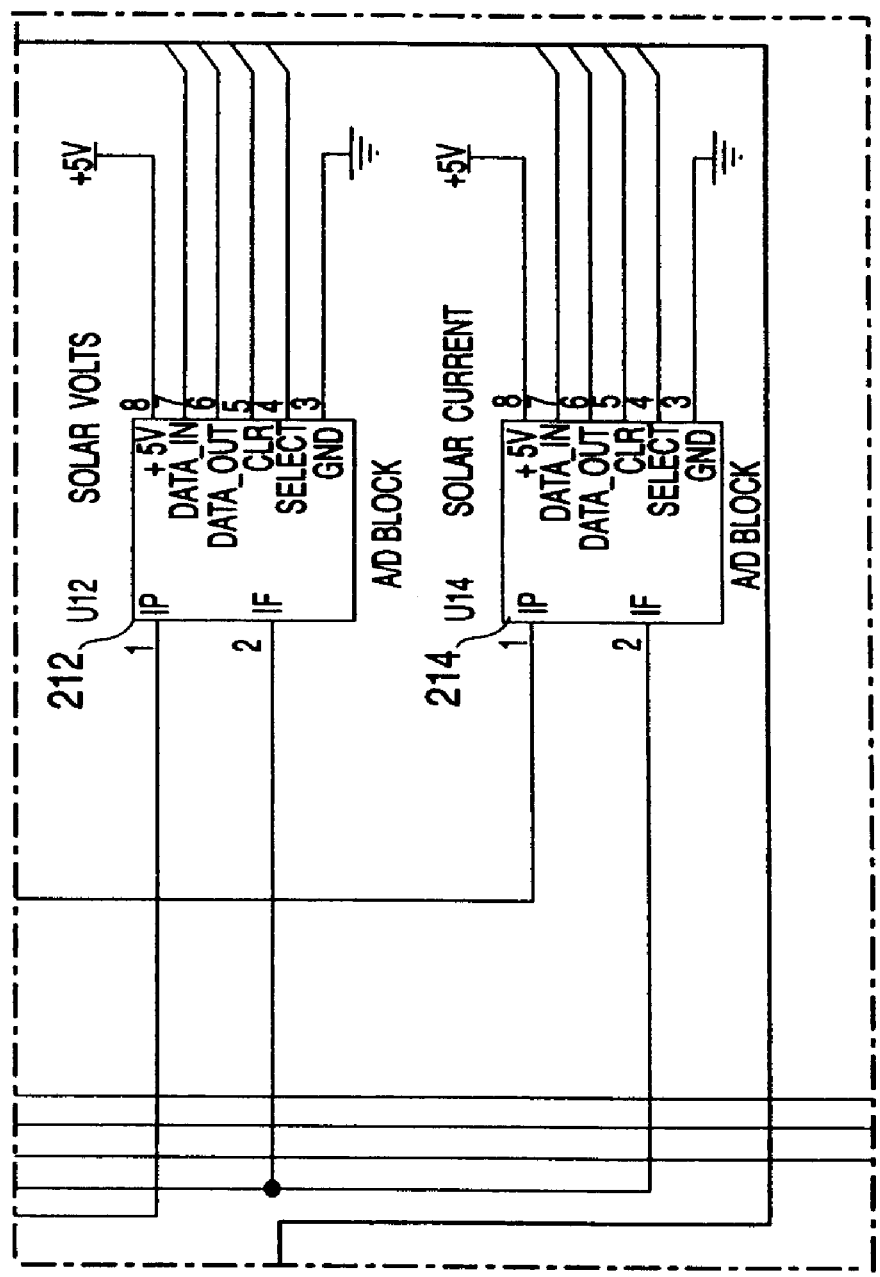
Figure 2J:
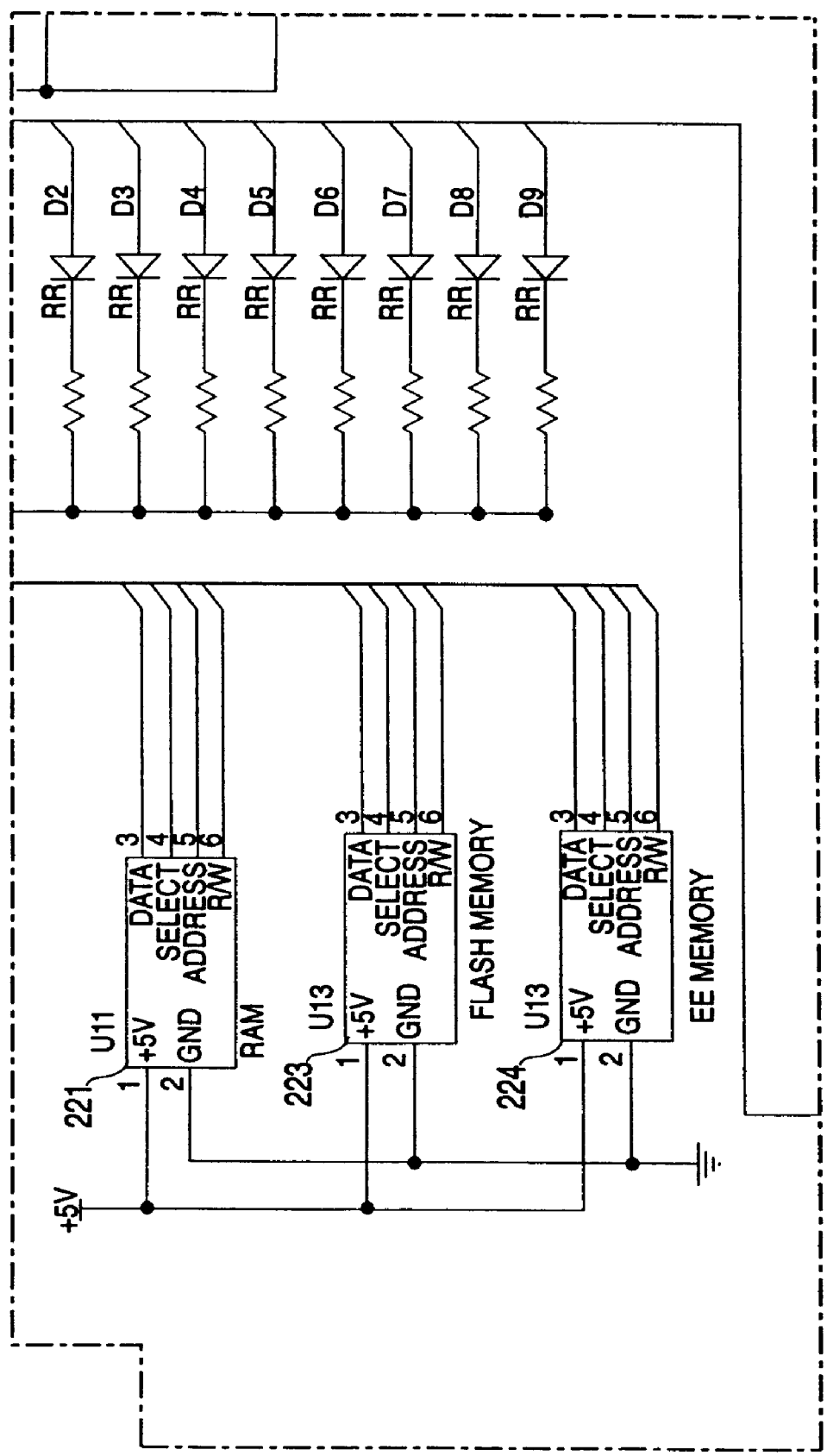
Figure 2K:
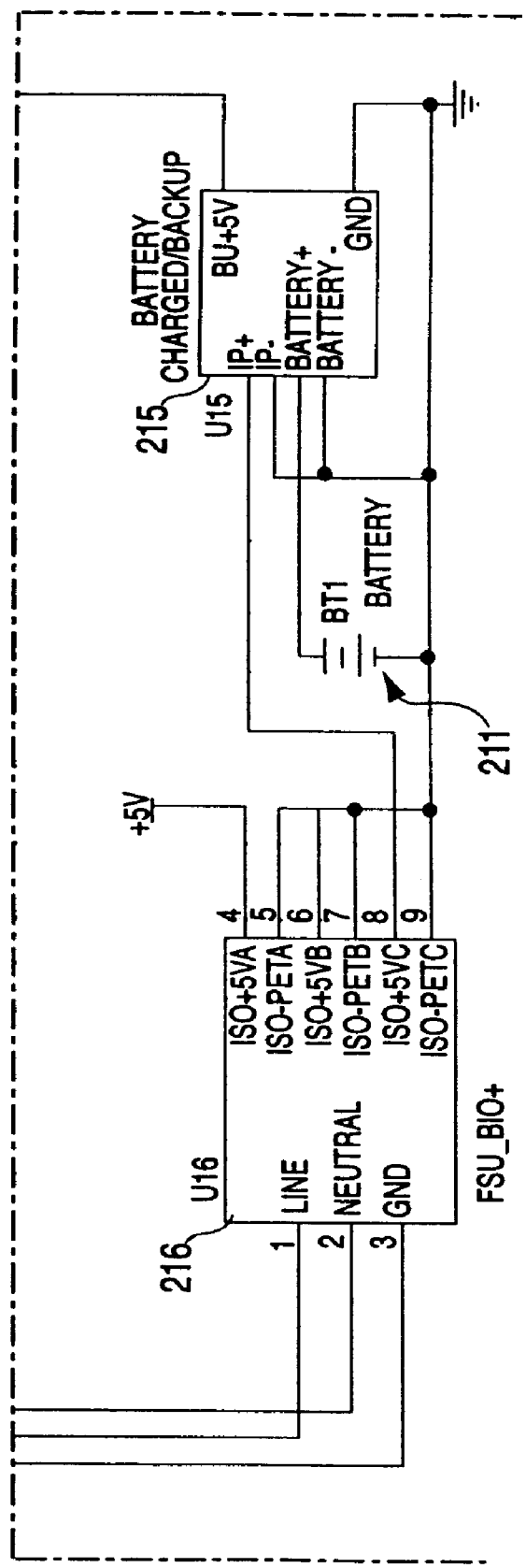

Referring to FIG. 1, a method by which a solar power conditioner supplements electrical power generated by a power utility during peak power-demand periods is shown. In step 10, a main reference AC power is received by the solar power conditioner. Receipt of such electrical power can be by a positioning of the solar power conditioner in-line (e.g., in series) with the main AC power line or by a power tap (e.g., in parallel) of the main AC power line. The AC power can be generated by an electrical power utility or the like. It is to be understood, of course, that such power receipt is not to be limited to the methods herein disclosed, and rather that any means by which a main AC power source is received is acceptable. Furthermore, it is to be understood, of course, that power generation is not to be limited to generation by a power utility, and rather that any means by which the electrical AC power can be generated is acceptable.

Upon receipt of the input of the reference AC power, in step 20 that reference AC power is digitized at the earliest point in the solar power conditioner circuitry. Such digitization occurs through the use of analog to digital (A/D) converters, preferably 14 bit A/D converters, which are galvanically isolated from the AC power source. The A/D converters convert the AC power fed through them to data regarding the AC power's power level, current, voltage and phase.

Once in the digital domain, in step 30, the reference AC power characteristics are monitored through the use of digital signal processing and a micro-controller to provide all of the intelligence to measure, compare, compute and control the AC power characteristics. Monitoring occurs then, as the digitized AC power characteristics are fed as data to the micro-controller (i.e., a central processor unit (CPU)) for analysis. Accordingly, in the digital domain, all signal processing is achieved mathematically.

Concurrently with the above-described steps 10 through 30, the solar power conditioner is readying the alternate power source with which to supplement the main AC reference power. Thus, in step 40, a generated DC power is received by the solar power conditioner. DC power generation is preferably accomplished through the use of a solar panel array, connected to the solar power conditioner, and which converts solar energy it receives from sunlight into the direct current. It is to be understood, of course, that such DC power generation need not be limited to the use of solar panels, and rather that any acceptable DC power generation means may be utilized.

Upon receipt of the generated DC power, in step 50 the DC power is applied to a pulse width modulator for conversion to AC sine wave power. The modulator uses an adaptive means to create an AC sine wave. This modulated AC power is then, in step 60, digitized. Digitization of the modulated AC power is through additional analog to digital converters. The digitized modulated AC power characteristics are then fed to the micro-controller.

Having the concurrently digitized reference AC power characteristics and modulated AC power characteristics given to it by each of the A/D converters, in step 70 the micro-controller CPU calculates/determines the following:

the mains reference AC root mean square (RMS) voltage, phase, harmonic content in real time;

the mains reference AC RMS current, phase, and harmonic content in real time;

the AC power;

the solar power generated modulated AC output RMS voltage of unit, phase, and matching harmonic content in real time;

the solar power generated modulated AC output RMS current of unit, phase, and matching harmonic content in real time;

the Power and Power factor;

the solar panel DC voltage;

the solar panel DC current;

the solar power;

the solar power to AC power conversion efficiency; and the adaptive power output of the solar panel (dependent upon light conditions).

Thus the operational parameters of the solar power conditioner are calculated and set by the micro-controller. It is to be noted, therefore, that it is possible to allow for some of the operational parameters to be user-programmable through software interfacing means. Accordingly, such is incorporated into the present invention.

Upon calculation and setting of the operational parameters, in step 80, the micro-controller then matches the modulated AC power to that of the reference AC power in precise terms of current, voltage, phase and harmonic content. Such matching occurs through logical control of the pulse width modulator and accompanying adaptive filters. The micro-controller is able, therefore, to accomplish matching within a time-frame of 50 micro-seconds and to a degree of better than 0.1 in phase lock. Such an operation conversion of power is in the region of 96% efficiency.

When such conditions are in fact met, in step 90 the micro-controller closes a breaker, so that virtually no current is flowing from the main reference AC power source. Having closed the breaker, in step 100 the processor ramps up the current of the modulated AC power and provides that as an output.

Referring to FIG. 2, a preferred embodiment of an electrical circuit diagram for the solar power conditioner 200 is illustrated. AC mains power enters the device at connection point 202. As mentioned above such connection may be accomplished in series or in parallel to the main power line (not shown). Accordingly, safety fusing 203 is provided and the mains voltage is then applied to a small power supply unit 204.

The power supply unit 204 is then able to provide isolated power to the three A/D converters 205, 206 and 207. The A/D converters 205, 206 and 207 digitize the input AC voltage, output AC current, and output AC voltage respectively. The use of the optically isolated A/D converters 205, 206 and 207, together with a circuit breaker 208, allows galvanic isolation of the circuit when the device is "off-line". Thus, galvanic isolation is achieved when necessary between the solar panel 201, the solar power conditioner electronics 200, and the mains AC power supply. Galvanically isolated data from the A/D converters are therefore, always available, providing characteristics of the AC mains voltage, the generated AC voltage and the AC current, to the processor 209. It is to be understood, of course, that circuit breaker 208 can be either an electromechanical part or a semiconductor part.

Additionally, a small isolated power supply 216 is used to provide regulated power to the solar power conditioner electronics and correct charging current (a "trickle charge") for a back-up battery 211 via a battery charger 215. This battery provides power for the clock circuit and data storage associated with the processor 209 in the event of mains AC power failure. Moreover, it allows the system to record any disturbance data to be later down loaded for subsequent analysis.

Simultaneously with the above, DC power generated by the solar panels 201, enters solar power conditioner 200 at connection point 201.5. Accordingly, safety fusing 210 is again provided, and the solar DC voltage is applied to a pulse width modulator (PWM) 213 via a current sense resistor 217. Current sense resistor 217 is used to measure the current from the solar panel 201, providing a small voltage which is applied to the input of a solar current A/D converter 214 for digitizing. Concurrently, the solar DC voltage is also applied to the solar volts A/D converter 212 for digitizing. The above circuitry thereby allowing monitoring of the input power from the solar panel 201.

Following the breaker 208 is a Kelvin connected current sense (shunt) resistor 219, which is used to measure the direction and amplitude of the current produced by the solar power conditioner 200. This current sense resistor provides 219 a small AC voltage which is applied to the input of the A/D converter 206 for digitizing. The AC power generated by the inverter is likewise applied to the input of the circuit breaker 208 and monitored by the A/D converter 207 for digitizing.

The processor 209 then receives data from all five of the A/D converters 205, 206, 207, 212 and 214 and calculates/determines the operational parameters described above. Equating all data from the A/D converters, the processor 209 produces a push-pull drive signal to the PWM 213. The processor 209 aims to match the generated AC power of the inverter to that of the AC mains in precise terms of RMS (root mean square) voltage, phase (to within one degree) and harmonic content. Upon successful matching, the processor 209 closes the circuit breaker 208 and, with virtually no current flowing at this time, proceeds to "ramp-up" the current, aiming for a maximum power for that particular model of conditioner.

Concurrently with the above, the processor 209 is continually monitoring the DC condition of the power from the solar panel 201 (both in terms of volts and current). Also concurrently, the PWM semiconductor power switching devices 213 are monitored in terms of peak and RMS current and junction temperature to avoid possible breakdown. The processor 209 monitors and adjusts the active low pass adaptive filter 218 where precise reconstruction of the sine wave and harmonic content occur. The processor accesses the solar volts and amps and solar panel characteristics stored in memory (described below), adjusts the PWM 213 and filter 218 relationship for optimum efficiency. Accordingly, the above circuitry and subsequent monitoring features make possible an accurate assessment of the overall efficiency of the solar power utilization and avoidance of an over-dissipation in the PWM 213. Additionally, this monitoring allows accurate matching of the generated AC power with mains power.

The PWM section 213 together with the adaptive filter 218 is of a modular construction. This modular concept allows units of various wattage to be constructed using identical software and processor hardware. Changes, which are required to increase the wattage of the unit and apply a different range of settings to the processor, can be made by installation of additional modules along with the appropriate selection of shunts.

The software together with modular settings information is stored in non-volatile flash memory 223, while an $E^2$ memory 224 is used to store settings, records, and disturbance data together with watt hours produced. A static random access memory (SRAM) 221 is provided for the processor 209 to use in the course of running the software, making all calculations, optimizing the efficiency of the conversion process, storing records, maintaining time and date (Y2K compatible) and logical decision making.

Additionally the processor 209 continually calculates date and time of day, manages the serial communication ports (with connectors) 241 and 242, the infrared (IR) port 235 and 236, the Ethernet port 230, TCPIP stack 231, the modem 229, and writes data to a light emitting diode (LED) annunciator 220 to indicate status and operational conditions. The processor 209, in conjunction with the clock, calculates solar intensity and the optimum times during each day of each season to enable the solar panel 201 for power generation. This assures the best possible panel life and performance.

Incorporated into the design is a complete electricity meter 238 as a "stand alone" module, which may be fitted or not according to the application. When installed, the meter will share its data with the main processor and can be remotely read via the serial port, the Ethernet port, the modem (dial-up), the Internet (using the TCPIP stack), the IR port, or the LED readout. With the explosion of the Internet and its penetration into US homes (i.e., the advent of cable modems and DSL/ADSL connections which are "up" 24 hrs each day), it is possible that the Internet will be the method of choice (using an appropriate browser), and for this reason the Ethernet feature has been added to facilitate easy connection to a DSL/ADSL/Cable modem/Home net installation.

Figure 3:
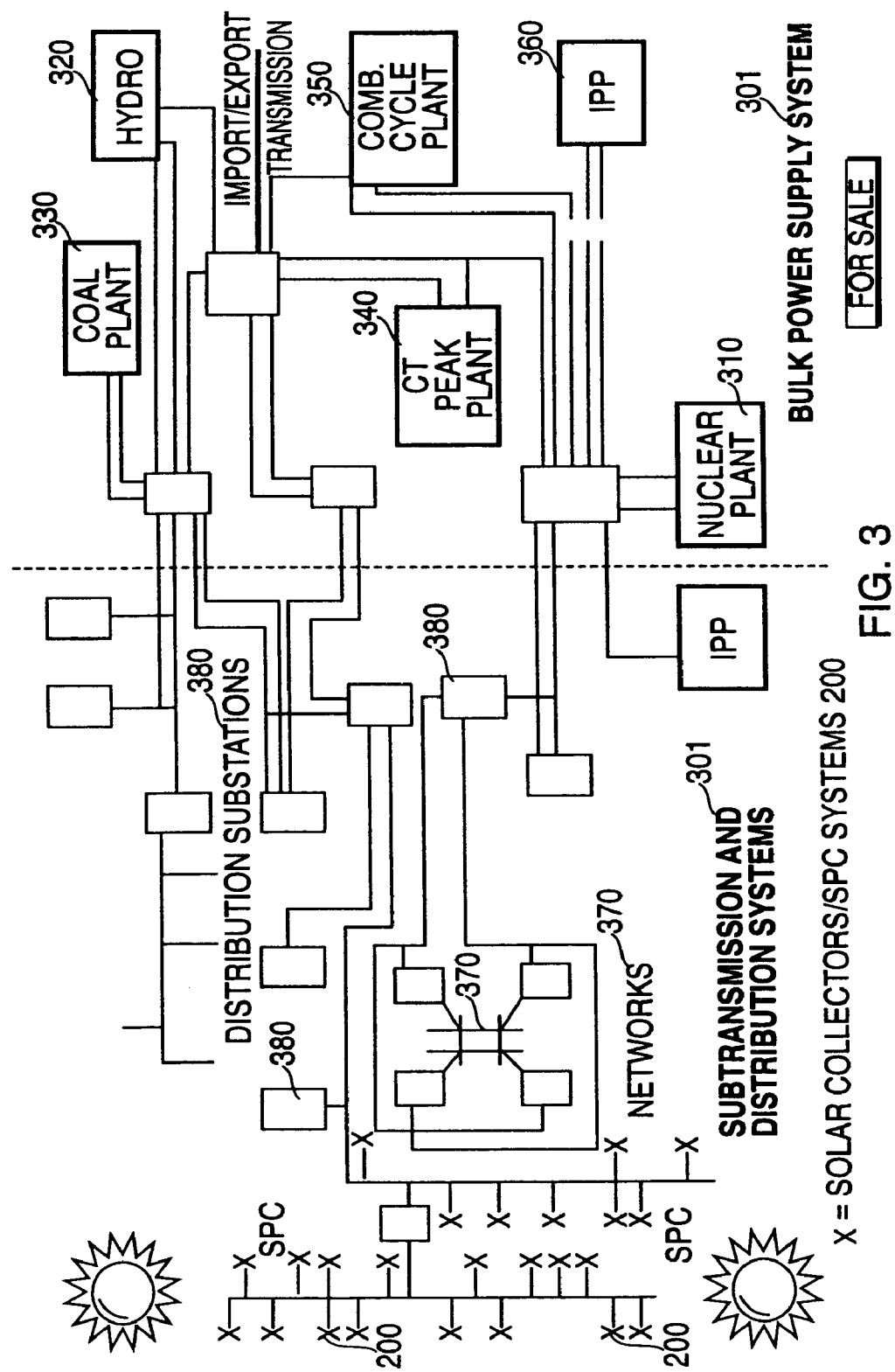
FIG. 3 illustrates a diagram of the basic elements of a typical modern integrated electric power system including the solar power conditioner based distributed power generation, according to an embodiment of the present invention.

Referring now to FIG. 3, integration of the solar power conditioner into a typical modern electrical power system for distributed power generation is shown. The typical modern electrical power system comprises a bulk power supply system 300 and a sub-transmission and distribution system 301. The bulk power supply system 300 is a system in which power is generated and offered for sale. Known types of power generators in the supply system are: a nuclear power plant 310, a hydro-electric power plant 320, a coal-burning electric generation plant 330, a CT peak plant 340, a combination recycling plant 350, and an IPP 360. Other means of importing and/or exporting electrical power through transmission or otherwise can also be included. Each of these components of the electrical bulk power supply system 300 can be co-joined through electrical power transmission lines and/or may be co-located. It is to be understood, of course, that any means by which electrical power may be generated can be a part of the bulk power supply system 300 and it is not to be limited to those disclosed herein.

The electrical power generated and for sale by the bulk power supply system 300 is distributed by the sub-transmission and distribution systems 301. The sub-transmission and distribution systems 301 is comprised of a known series of electrical transmission networks 370 and distribution substations 380. The power transmission networks 370 and distribution substations 380 are linked through a series of power distribution lines.

Integration of the solar power conditioner 200 can be such that the conditioner 200 is inserted into the sub-transmission and distribution system 301 by insertion in a network 370 or as an add on to a distribution substation 380.

Figure 4A:
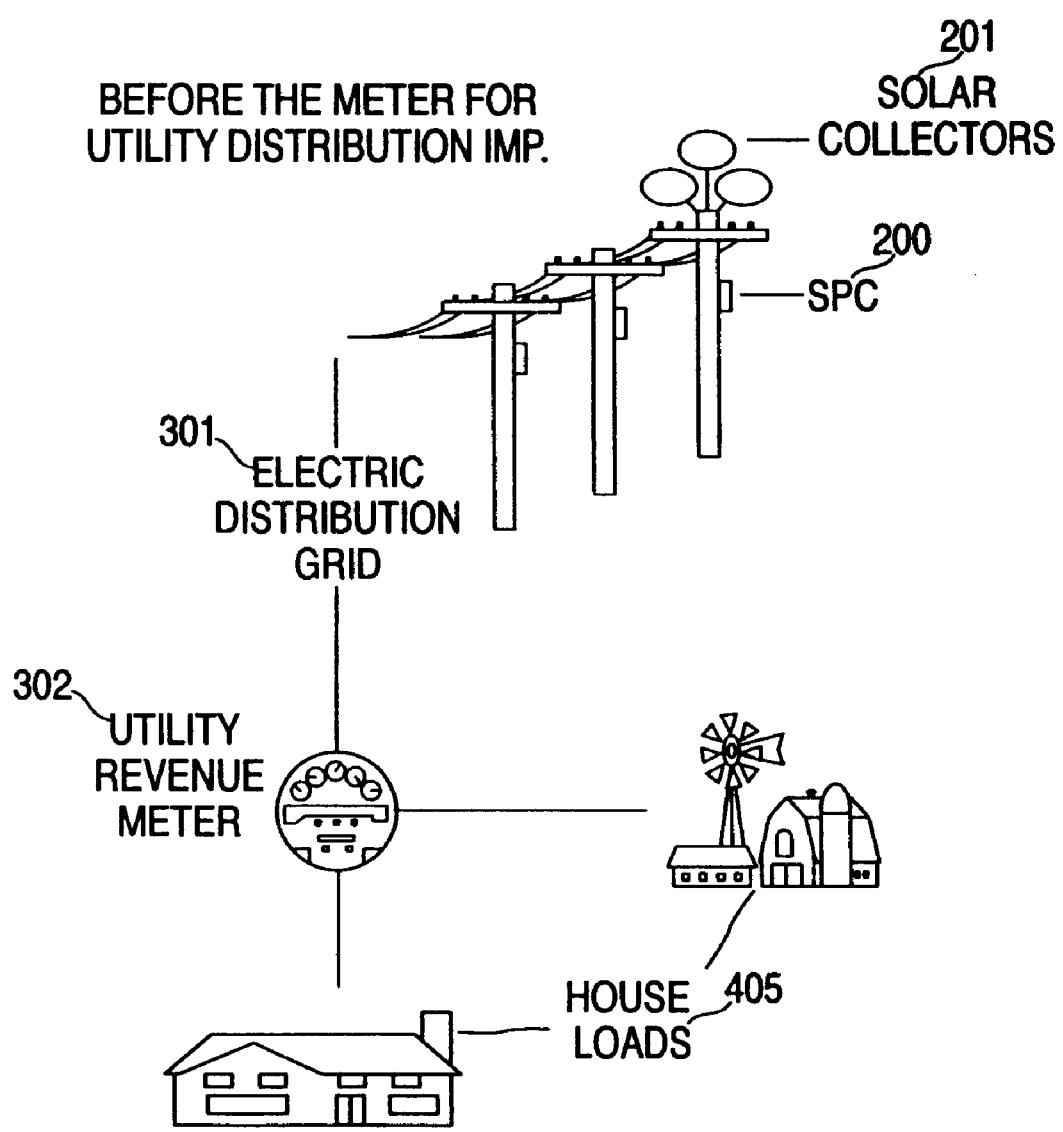
FIGS. 4a and 4b illustrate diagrams of examples as to where the solar power conditioner may be inserted into a utility distributed power grid, according to an embodiment of the present invention.
Figure 4B:
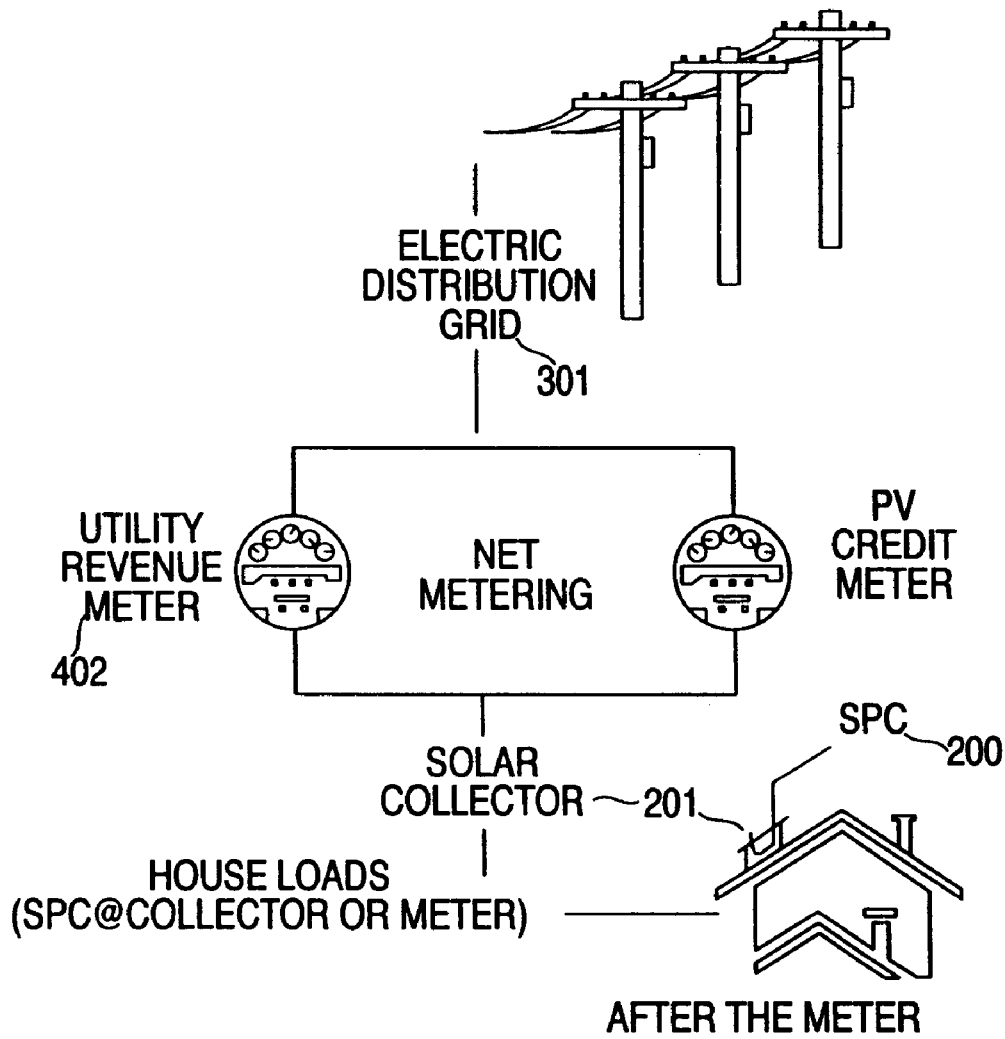

Referring now to FIGS. 4a and 4b, examples of how the solar power conditioner may be inserted into the electrical power system's distribution grid is shown. In FIG. 4a, an insertion of the solar power conditioner into the power utility distribution network before a utility revenue meter is shown. Thus, the solar power conditioner 200 with its solar panel collection array 201 is inserted in the electrical distribution grid 301 by attachment to such means as attachment to utility poles, street light poles, transmission towers and the like. In this manner, the solar power conditioner 200 is inserted before the utility revenue meter 302 which is attached to and/or reads the electrical consumption of the house loads 405.

In FIG. 4b, an insertion of the solar power conditioner 200 after a utility revenue meter is shown. In this case, the solar power conditioner is not attached to the electric distribution grid 301 but rather the solar power conditioner 200 and its solar panel collection array 201 is placed at the home and/or business after the utility revenue meter 402 and PV credit meter 403. It is to be understood that in such a case, the solar panel collection array 201 may be placed in such a location as the rooftop of the home and/or business, or in a closely associated position to the home and/or business (e.g., in the yard). In such an insertion example, the power generated by the solar panel collection array 201 can be used by the owners of the home and/or business to supplement in a cost free manner the power generated by the power utility.

As can be seen, the present invention provides for an economic means of providing electrical power to supplement peak power load requirements in an environmentally sound way. Additionally, since the solar-based power generation of the present invention can be of a distributed nature, existing wiring between the customer/appliance and the utility system can be used as a cost effective means to efficiently exchange electrical energy without altering the characteristic of the electricity distribution means employed.

In the foregoing description, the method and apparatus of the present invention have been described with reference to a number of examples that are not to be considered limiting. Rather, it is to be understood and expected that variations in the principles of the method and apparatus herein disclosed may be made by one skilled in the art and it is intended that such modifications, changes, and/or substitutions are to be included within the scope of the present invention as set forth in the appended claims. The specification and the drawings are accordingly to be regarded in an illustrative rather than in a restrictive sense.

What is claimed is:

1. A power conditioner for supplementing a main reference AC power with DC power from a DC power source, the power conditioner comprising:

a pulse-width modulator to modulate the DC power to provide AC power;

an analog-to-digital converter arrangement to digitize characteristic data of the main reference AC power and of the AC power to provide digitized characteristic data;

a processor arrangement to determine an operational parameter of the main reference AC power based on the digitized characteristic data; and an adaptive filter arrangement to adapt the AC power, together with the processor arrangement, and to match it to the main reference AC power based on the operational parameter.

2. The power conditioner of claim 1, wherein the characteristic data includes at least one of power level information, current information, voltage information and phase information.

3. The power conditioner of claim 1, wherein the characteristic data includes power level information, current information, voltage information and phase information.

4. The power conditioner of claim 1, wherein the processor arrangement determines at least one of the following of the main AC reference power:

one of a root-mean-square voltage and a root-mean-square current, a phase and a harmonic content in real-time; and the main reference AC power.

5. The power conditioner of claim 1, wherein the processor arrangement determines at least one of the following AC power parameters:

one of a root-mean-square voltage and a root-mean-square current, a phase and a harmonic content in real-time;

the AC power; and an AC power factor.

6. The power conditioner of claim 1, wherein the processor arrangement determines at least one of the following DC power parameters:

a DC voltage, a DC current, the DC power, and a conversion efficiency of converting the DC power to the AC power.

7. The power conditioner of claim 1, wherein the processor arrangement determines an adaptive DC power output of the DC power source.

8. The power conditioner of claim 1, wherein the processor arrangement determines the following main AC reference power parameters:

one of a root-mean-square voltage and a root-mean-square current, a phase and a harmonic content m real-time; and the main reference AC power.

9. The power conditioner of claim 1, wherein the processor arrangement determines the following modulated AC power parameters:

one of a root-mean-square voltage and a root-mean-square current, a phase and a harmonic content in real-time;

the AC power; and an AC power factor.

10. The power conditioner of claim 1, wherein the processor arrangement determines the following DC power parameters:

a DC voltage;

a DC current;

the DC power; and a conversion efficiency of converting the DC power to the AC power.

11. The power conditioner of claim 1, wherein the processor arrangement determines:

at least one of the following main AC reference power parameters:

one of a root-mean-square voltage and a root-mean-square current, a phase and a harmonic content in real-time, and the main reference AC power;

at least one of the following AC power parameters:

one of a root-mean-square voltage and a root-mean-square current, a phase and a harmonic content in real-time, the AC power, and an AC power factor;

at least one of the following DC power parameters:

a DC voltage, a DC current, the DC power, and a conversion efficiency of converting the DC power to the AC power.

12. The power conditioner of claim 1, wherein the processor arrangement determines:

the following main AC reference power parameters:

one of a root-mean-square voltage and a root-mean-square current, a phase and a harmonic content in real-time, and the main reference AC power;

the following modulated AC power parameters:

one of a root-mean-square voltage and a root-mean-square current, a phase and a harmonic content in real-time, the AC power, and an AC power factor;

the following DC power parameters:

a DC voltage, a DC current, the DC power, and a conversion efficiency of converting the DC power to the AC power.

13. The power conditioner of claim 1, further comprising:

a circuit breaker arrangement to isolate the power conditioner from the main reference AC power, wherein the analog-to-digital converter arrangement is optically isolated so that galvanic isolation is provided.

14. The power conditioner of claim 1, wherein the processor arrangement includes a micro-controller arrangement.

15. The power conditioner of claim 1, wherein the DC power source includes a solar cell arrangement.

16. The power conditioner of claim 1, further comprising:

power supply arrangement to supply power to at least one of a battery, a battery charger, the analog-to-digital converter arrangement and the processor arrangement.

17. The power conditioner of claim 1, further comprising:

a battery to supply power to the processor arrangement if the main reference AC power is one of isolated and fails.

18. The power conditioner of claim 1, further comprising:

an electricity meter to meter data relating to a power usage for use by the processor arrangement.

19. The power conditioner of claim 1, wherein the pulse-width modulator and the adaptive filter arrangement are a modular arrangement, so that a wattage of the power conditioner can be changed by adding or removing the modular arrangement.

20. The power conditioner of claim 1, further comprising:

at least one of a serial communications port, an infrared port, an Ethernet port, a modem, and a DSL/ADSL arrangement.

21. The power conditioner of claim 1, wherein the matching of the AC power to the main reference AC power is at least one of within a time-frame of 50 micro-seconds and a degree of at least 0.1 in phase lock.

22. The power conditioner of claim 1, wherein a conversion efficiency of matching the DC power to the main reference AC power is about 96%.

23. A method of supplementing a main reference AC power with DC power from a DC power source, the method comprising:

digitizing characteristic data of the main reference AC power;

monitoring the characteristic data of the main reference AC power;

pulse-width modulating the DC power to provide AC power;

digitizing characteristic data of the AC power;

determining operational parameter data of the main reference AC power based on the digitized characteristic data of the main reference AC power and the AC power; and matching the AC power to the main reference AC power based on the operational parameter data.

24. The method of claim 23, further comprising:

closing a circuit breaker to provide electrical isolation; and supplementing the main reference AC power with matched AC power.

25. The method of claim 23, wherein the characteristic data of the main reference AC power includes at least one of power level information, current information, voltage information and phase information.

26. The method of claim 23, wherein the characteristic data of the main reference AC power includes power level information, current information, voltage information and phase information.

27. The method of claim 23, wherein the AC power is matched to the main reference AC power as to one of a root-mean-square voltage and a root-mean-square current, a phase and a harmonic content.

28. The method of claim 23, wherein the characteristic data and operational parameter data includes:

at least one of the following main AC reference power parameters:

one of a root-mean-square voltage and a root-mean-square current, a phase and a harmonic content in real-time, and the main reference AC power;

at least one of the following AC power parameters:

one of a root-mean-square voltage and a root-mean-square current, a phase and a harmonic content in real-time, the AC power, and AC power factor;

at least one of the following DC power parameters:

a DC voltage, a DC current, the DC power, and a conversion efficiency of converting the DC power to the AC power.

29. An apparatus for supplementing a main reference AC power with DC power from a DC power source, comprising:

means for digitizing characteristic data of the main reference AC power;

means for monitoring the characteristic data of the main reference AC power;

means for pulse-width modulating the DC power to provide AC power;

means for digitizing characteristic data of the AC power;

means for determining operational parameter data of the main reference AC power based on the digitized characteristic data of the main reference AC power and the AC power; and means for matching the AC power to main reference AC power based on the operational parameter data.

30. The apparatus of claim 29, wherein the characteristic data includes at least one of current information, voltage information, phase information and harmonic current information.

31. The apparatus of claim 29, wherein the characteristic data includes current information, voltage information, phase information and harmonic current information.

32. The apparatus of claim 29, wherein the AC power is matched to the main reference AC power as to one of a root-mean-square voltage and a root-mean-square current, a phase and a harmonic content.

33. A power conditioner for supplementing a main reference AC power with DC power from a DC power source, comprising:

a first digitizing arrangement to digitize characteristic data of the main reference AC power;

a monitoring arrangement to monitor the characteristic data of the main reference AC power;

a pulse-width modulating arrangement to modulate the DC power to provide AC power;

a second digitizing arrangement to digitize characteristic data of the AC power;

a processing arrangement to determine operational parameter data of the main reference AC power based on the digitized characteristic data of the main reference AC power and the AC power, and to match the AC power to main reference AC power based on the operational parameter data.

34. The power conditioner of claim 33, wherein the AC power is matched to the main reference AC power as to one of a root-mean-square voltage and a root-mean-square current, a phase and a harmonic content.

35. A power conditioner for supplementing a main reference AC power with DC power from a DC power source, comprising:

a pulse-width modulating arrangement to pulse-width modulate the DC power to provide AC power;

a digitizing arrangement to digitize characteristic data of the main reference AC power and of the AC power for providing digitized characteristic data; and a determining arrangement that uses the digitized characteristic data to determine operating parameter data of the main reference AC power, and which adaptively filters the AC power to match the main reference AC power based on the operating parameter data.

36. The power conditioner of claim 35, wherein the modulated AC power is matched to the main reference AC power as to one of a root-mean-square voltage and a root-mean-square current, a phase and a harmonic content.

* * * * *